Aug. 26, 1930.  U. A. WHITAKER  1,774,163
VALVE MECHANISM FOR AUTOMATIC TRAIN PIPE COUPLINGS
Filed Dec. 14, 1928
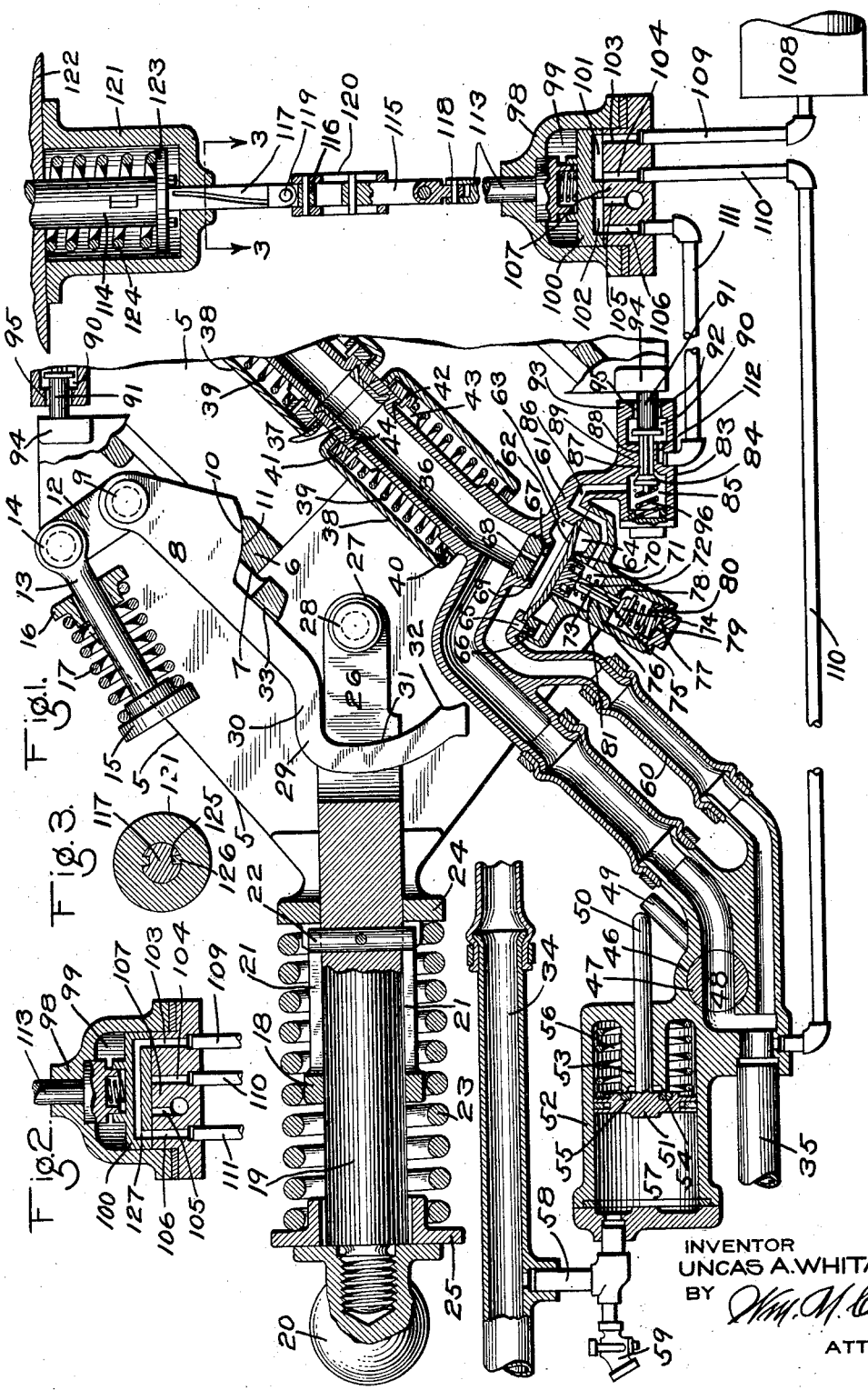
INVENTOR
UNCAS A. WHITAKER
BY Wm. M. Cady
ATTORNEY Patented Aug. 26, 1930

1,774,163

UNITED STATES PATENT OFFICE

UNCAS A. WHITAKER, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

VALVE MECHANISM FOR AUTOMATIC TRAIN-PIPE COUPLINGS

Application filed December 14, 1928. Serial No. 326,089.

This invention relates to automatic train pipe couplings, and more particularly to the type known as the tight or rigid lock coupling.

An object of the invention is to provide a train pipe coupling of the above mentioned type with means for controlling the flow of the fluid through the brake pipe so as to permit at least a service reduction when the couplings are connected regardless of the position of the handle of the brake pipe angle cock.

Another object of the invention is to provide a train pipe coupling of the above mentioned type with means by which the charging of an empty section of train from a charged section will be effected without causing an emergency application on the charged section.

Another object of the invention is to provide valve mechanisms for an automatic train pipe coupling wherein a conduit in the coupling head which is connected to the brake pipe is also connected to the brake pipe by a second conduit constituting a by-pass around a valve in the brake pipe, the by-pass containing an automatically operated valve device adapted to control communication through the conduit when the brake pipe valve is closed.

Another object of the invention is to provide a train pipe coupling of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings; Figure 1 is a longitudinal section of an automatic train pipe coupling embodying the invention, showing the same coupled to a counterpart coupling; Fig. 2 is a section of the rotary valve device shown in Fig. 1, showing the valve thereof positioned to effect the closing of the brake pipe by-pass valve device when the couplings are being coupled; and Fig. 3 is a section taken on the line 3—3 of Fig. 1.

Train pipe couplings of the type known as the tight or rigid lock coupling, are shown for example in the Westinghouse Patent No. 708,747, dated September 9, 1902, and in which each coupling head is provided with a laterally projecting hook-shaped portion adapted to engage the corresponding portion of a counterpart coupling by a relatively lateral movement, and be rigidly locked together by cam levers or latches, one pivoted on each coupling head and bearing against the other counterpart coupling head. Train pipe passages are in the coupling heads and are provided with gaskets adapted to abut against corresponding gaskets of the counterpart coupling head when the two are connected together.

While a coupling of the above type will automatically couple with a counterpart coupling when two cars are brought together, it is necessary to manually operate the train pipe valves to charge an empty section of train from a charged section.

By the present invention, means are provided for automatically by-passing the brake pipe angle cock when the coupling is being coupled to a counterpart coupling so that when an empty section of train is connected to a charged section the fluid flowing into the uncharged section will be at such a rate as to prevent an emergency application of the brakes on the charged section.

Referring to the drawings, the automatic train pipe coupling head 5 comprises a projecting nose 6 adapted to engage in a recess 7 of a counterpart coupling head.

A lever 8, pivoted in the coupling head 5 at 9, has a cam face 10 for engaging the face 11 of a counterpart coupling head, to lock the two coupling heads together when the same are coupled in the manner shown in Fig. 1.

The lever 8 carries an arm 12, to which a rod 13 is pivotally connected by a pin 14. The outer end of the rod 13 is provided with a head 15, and interposed between said head and a fixed abutment 16, is a coil spring 17.

The rear end of the coupling head 11 is formed with a tubular extension 18 which constitutes a guide for the forward end of a stem 19.

The stem 19 has its rear end provided with a ball section 20 adapted to be mounted in a socket (not shown) carried by the car.

The tubular extension 18 is provided with diametrically disposed longitudinal slots 21 into which extend the projecting ends of a pin 22 which is passed transversely through the stem 19.

A coil spring 23 encircles the stem 19 and the tubular extension 18, one end of the spring bearing against a flange 24 formed on the inner end of the coupling head, while the opposite end of the spring bears against a collar 25 at the inner end of the stem.

The spring 23 is normally under initial compression which tends to hold the parts extended. However, when the coupling head is coupled to a counterpart coupling, the spring is compressed, and the forward end of the stem 19 is disposed in the coupling head in the manner shown in Fig. 1, for a purpose to be described.

At the front end, the stem 19 is provided with an extended portion 26, on which a roller 27 is mounted by means of a pin 28. The roller 27 is disposed along the longitudinal center line of the stem and it is adapted to be engaged by the hook-shaped end 29 of an arm 30 extending from the lever 8.

When the coupling head is coupled with a counterpart coupling, the spring 17 will force the cam surface 10 of the lever 8 tightly into engagement with the surface 11 of the counterpart coupling and the end 29 of the arm 30 will be disengaged from the roller 27. However, when the cars are uncoupled and the couplings separate, the spring 23 will force the coupling head outwardly on the stem 19, thereby bringing the cam surface 31 on the end 29 of the arm 30 into contact with the roller 27.

The extremity of the arm 30 is formed with an arcuate recess 32 into which the roller 27 seats when the coupling head 5 is moved outwardly with respect to the stem when the coupling is being uncoupled. In this way the lever 8 will be retained in its innermost position within the coupling head and it will be disposed out of the path of the nose 6 of a counterpart coupling head.

For the purpose of limiting the outward movement of the lever 8, the coupling head is provided with a lug 33 against which the arm 30 may strike, should the interlock provided when the roller 27 is positioned in the recess 32 be detached when the coupling head is uncoupled.

The brake pipe 35 is connected to one end of a conduit 36 with which the coupling head 5 is provided.

The front or nose end of the conduit 36, carries a gasket 37 adapted to engage the corresponding gasket on a counterpart coupling head and make a fluid tight joint when the couplings are connected together.

The forward portion of the conduit 36 is enclosed by a tubular casing 38 containing an expansible coil spring 39, one end of which bears against a collar 40 carried by the casing 38, while the other end thereof bears against a sleeve 41 encircling the end portion of the conduit 36 adjacent to the gasket 37.

The sleeve 41 carries a plurality of pins 42 which project inwardly therefrom. The extremity of each pin is disposed within a slot 43 formed on the exterior of the conduit 36.

The pressure exerted by the spring 39 against the sleeve 41 normally retains the pins 42 in engagement with a step or shoulder 44 formed on the exterior of the conduit 36 at the end of the slots 43. In this way the abutting gaskets 37 of the two coupling heads will be held tightly together irrespective of the relative movements of the coupling heads when the cars are in motion, as will be understood.

Mounted in a chamber 46 formed in the brake pipe 35 is an angle cock device comprising a plug valve 47 having a port or waterway 48 adapted to register with the brake pipe passage when the valve is fully opened to permit an unrestricted flow of fluid therethrough.

The plug valve 47 has a handle or arm 49 which is adapted to be actuated by the rod 50 of a piston 51 mounted in a cylinder 52. The piston rod 50 is guided by a boss 53 formed in the end of the cylinder 52.

A seat rib 54 is formed on the end face of the boss 53, against which a valve 55 on the piston 51 rests, when the piston is at one end of its stroke.

This piston 51 is forced away from the seat rib 54 by a coil spring 56, which encircles the boss 53, one end of the spring bearing against the piston, and the opposite end of the spring bearing against the end wall of the cylinder 52.

A chamber 57 on the side of the piston 51 opposite to the spring 56, is connected to the signal pipe 34 by a pipe 58, and in order to permit venting of the signal pipe and the cylinder 57 when the cars are coupled, the pipe 58 is provided with a valve 59 adapted, upon operation, to vent the pipe 58 to the atmosphere.

Connected to the portion of the brake pipe 35 inwardly from the valve 47 and also connected to the conduit 36, is a second conduit 60, which provides a by-pass around the plug valve 47, through which brake pipe fluid can flow when the plug valve is closed.

The conduit 60 is provided with a valve device 61 adapted to be automatically actuated when the cars are being uncoupled to shut off communication through the conduit 36, after the plug valve 47 has been closed. The valve device 61 is also adapted to be automatically operated when the cars are brought together for coupling up to establish communication from the brake pipe to the conduit 36 before the plug valve 47 has been opened.

The valve device 61 includes a diaphragm 62 which is mounted in the valve casing for movement toward and away from a seat rib 69 projecting into a chamber 63. The chamber 63 is connected to the conduit 60, and is also connected to the conduit 36 through a passage 67 having a restricted portion 68 therein to provide a choke. The seat rib 69 surrounds the passage 67, so that when the diaphragm is unseated therefrom, fluid under pressure delivered to chamber 63 from the brake pipe 35 through conduit 60, will be permitted to flow through passage 67 into conduit 36, the restricted opening 68 restraining the amount of fluid flowing into the conduit 60 for a purpose to be hereinafter described.

The chamber 63 is in communication with a chamber 64, on the other side of the diaphragm 62, through a passage 65 having a restricted portion 66 therein to provide a choke.

When the coupling head is coupled to a counterpart coupling, the diaphragm 62 will be unseated from the seat rib 69, and will be seated against a seat rib 70 so as to close the chamber 64 from a chamber 71 of less area. The portion of the diaphragm disposed within the seat rib 70 carries a head 72.

The fluted stem 73 of a valve 74 extends through an opening 75 in a wall 76 separating the chamber 71 from a chamber 77 and bears against the head 72. A seat 78 is formed in the wall 76 for the valve 74. The chamber 77 is open to the atmosphere through an opening 79. Mounted in chamber 77 is an expansible coil spring 80 which bears against the head of the valve 74 and maintains the stem 73 in contact with the head 72.

Mounted in chamber 71 and encircling the valve stem 73, is an expansible coil spring 81, which bears against the head 72 and tends to force the diaphragm 62 away from the seat rib 70 against the pressure of fluid in chamber 63.

Inasmuch as chamber 71 will be open to the atmosphere through opening 75, chamber 77 and opening 79 when the couplings are connected, the portion of the diaphragm 62 outside of the seat rib 70 will be balanced, due to the free communication through passage 65 to both sides thereof, but since the area of the diaphragm inside of seat rib 70 is exposed to atmospheric pressure, the fluid under pressure in chamber 63 will maintain the diaphragm against seat rib 70.

Associated with the valve device 61, is a controlling device 83 which includes a valve 84 contained in a chamber 85. The chamber 85 is connected to the chamber 71 by a conduit 86.

The valve 84 has a fluted stem 87 which extends through an opening 88 formed in a wall 89 separating the chamber 85 from a chamber 90 and engages the head of a plunger 91.

The shank of the plunger 91 is mounted in an opening 92 formed in the outer end wall 93, and the extremity of the plunger abuts a lug 94 on the counterpart coupling head when the couplings are coupled together so as to unseat the valve 84.

Chamber 90 is vented to the atmosphere through a leakage groove 95 formed longitudinally of the opening 92.

An expansible coil spring 96 is mounted in the chamber 85 and bears against the head of valve 84. This spring is adapted to force the valve 84 to its seat when the couplings are being uncoupled, so as to prevent the passage of fluid from chamber 85 into chamber 90.

Associated with the controlling device 83 is a rotary valve device 98 having a chamber 99 containing a rotary valve 100.

The valve 100 is provided with cavities 101 and 102 which are adapted to register with ports 103 and 104 and ports 105 and 106 respectively, in the seat 107 of the valve.

The port 103 is connected to a reservoir 108 by a pipe 109, while the port 104 is connected to the brake pipe 35 by a pipe 110. In one position of the rotary valve 100, the cavity 101 is adapted to connect the ports 103 and 104 so that the reservoir 108 will be charged from the brake pipe 35 when the coupling heads are coupled together.

Chamber 90 is connected to a restricted passage 112, pipe 111, port 106, and cavity 102 in the rotary valve 100, with atmospheric exhaust port 105.

The rotary valve 100 has a shaft 113 which is connected to the car coupling pin 114 through a plurality of shafts 115, 116 and 117, arranged in vertical alinement, shaft 117 being connected to the end of the coupler pin 114.

Shaft 115 is connected to the shaft 113 by means of a universal joint 118, and shaft 116 is connected to shaft 117 by a similar type of joint 119.

Interposed between the ends of shafts 115 and 116 is a telescoping section 120 which permits raising and lowering movement of the car coupling and the train pipe coupling heads relative to one another and also vertical movement of the coupling pin 114 and shaft 117 relative to shaft 113. The universal joints 118 and 119 allow for angular movement between the car and train pipe coupling head.

The coupling pin 114 terminates within a casing 121 depending from the car coupler 122. The end of the coupling pin 114 has a flange 123 fixed thereto, against which bears one end of an expansible coil spring 124 which encircles the coupling pin 114 and is adapted to force the same downwardly.

The shaft 117 is slidably and rotatably mounted in the casing 121. Spiral grooves 125 are formed in the shaft 117 and receive tongues 126 formed on the casing 121, so that when the shaft 117 is raised with the coupling pin 114, in the manner to be hereinafter described, it will be rotated.

In operation, when it is desired to separate two cars of a train having the brake pipe charged with fluid under pressure, the valve 59 is turned to the position by which the fluid in the signal pipe 34 and the chamber 57 will be exhausted to the atmosphere, and the coupling pin 114 is raised through the usual mechanism (not shown), which will lift the shaft 117.

When the pressure of the fluid in the chamber 57 is reduced a predetermined amount, the spring 56 will force the piston 51 outwardly, thereby withdrawing the end of the rod 50 from the arm 49 of the plug valve 47.

The plug valve 47 is now manually turned to position the port 48 at right angles to the position shown in Fig. 1, thereby cutting off communication from the brake pipe 35 to the conduit 36. However, the diaphragm 62 will remain seated against the seat rib 70, because the fluid pressure in chamber 63 will remain equal to the pressure of the fluid in the brake pipe 35 due to the direct communication from chamber 63 to the brake pipe 35 afforded by the conduit 60.

Accordingly a restricted amount of fluid will be permitted to flow from the brake pipe 35 through conduit 60, chamber 63, passage 67, and choke 68, into the conduit 36, until the diaphragm 62 is moved, in the manner to be hereinafter described, from the seat rib 70 and seated against the seat rib 69 to shut off communication from the conduit 60 to the conduit 36.

When the coupling pin 114 is raised to unlatch the car couplers, and the shaft 117 is also raised by said pin, the shaft 117, during its upward movement, will be rotated through the medium of the spiral grooves 125 and the tongues 126. The turning of the shaft 117 is transmitted through the universal joint 119, to shaft 116, which in turn transmits the rotary movement through the telescopic connection 120 to shaft 115, and thence through the universal joint 118 to the shaft 113 of the rotary valve 100.

When the rotary valve 100 is thus rotated, the cavity 101 will be moved from the ports 103 and 104 and the cavity 102 will be moved from the ports 105 and 106, the angle of rotation of the valve 100 being sufficient to connect the port 103 to the port 106 through a cavity 127 (see Fig. 2).

Inasmuch as the pressure of the fluid in the reservoir 108 will be substantially equal to the pressure of the fluid in the brake pipe 35 when the coupling heads 5 are connected, when the cars are being uncoupled and port 104 has been closed in the manner just described, fluid from the reservoir 108, flowing through the rotary valve device 98, will pass through port 106, pipe 111 and restricted opening 112 and enter chamber 90 of the controlling device 83. As the valve 84 will be unseated, the fluid delivered to chamber 90 from the reservoir 108 will flow through openings 88 into chamber 85, and will thence flow through conduit 86 to chamber 71.

Obviously some of the fluid entering chamber 90 will pass to the atmosphere through groove 95, and also some of the fluid entering chamber 71 will pass to the atmosphere through opening 75, chamber 77, and opening 79, because valve 74 will be unseated, as shown in Fig. 1 but the amount of fluid lost to the atmosphere through these two atmospheric openings is not sufficient to prevent a build up of the pressure in chamber 71.

When the fluid pressure is thus built up in chamber 71 an amount sufficient to balance the pressure of the fluid on the other side of the diaphragm 62, the force exerted by spring 81 will be sufficient to move the diaphragm 62 from the seat rib 70 and seat the same against the seat rib 69, against the pressure of the fluid in chamber 63. This will cut off communication from conduit 60 to the conduit 36.

When the cars are uncoupled, the train pipe couplings will remain coupled and locked together until the cars have moved apart sufficiently to pull the coupling heads 5 outwardly of the stems 19, and further longitudinal movement is prevented by the pins 22 engaging the ends of the slots 21.

This action will move the ends 29 of the arms 30 toward the extremities of the portions 26 of the stems. When the cam surfaces 31 engage the rollers 27, the arms 30 will be caused to move laterally of the stems until the rollers 27 engage in the recesses 32. The cam surfaces 10 of the levers 8 will thus be withdrawn from the faces 11 of the coupling heads, and the couplings will be unlocked.

The movement of the diaphragm 62 from the seat rib 70 to the seat rib 69 heretofore described is adapted to be effected before the lug 94 on the counterpart coupling head has moved away from the end of the plunger 91 when the coupling heads separate and the abutting gaskets 37 are pulled apart.

When the lug 94 moves away from the end of the plunger 91 as the coupling heads are uncoupled, the spring 96 will force the valve 84 to its seat, and therefore, the fluid entering chamber 90 from the reservoir 108 will pass to the atmosphere through leakage groove 95.

After the coupling heads separate the valve 59 can be turned to cut off the vent to the atmosphere for the signal pipe 34 and the cylinder 57.

On the other hand, in coupling a section of train having an uncharged brake pipe to a section having a charged brake pipe, when the cars are brought together for coupling up, the impact of the two coupling heads coming together will move the coupling head 5 rearwardly on the stem 19, and this action will detach the roller 27 from its engagement with the recess 32 of the arm 29.

When the projecting nose 6 of one train pipe coupling enters the recess 7 of the counterpart coupling, the gaskets 37 will abut and the conduits 36 of the two coupling heads 5 will be connected together. The pressure of spring 17 will force the lever 8 outwardly toward the nose 6 of the counterpart coupling head so that the cam face 10 engages the face 11 and locks the two coupling heads tightly together, in the manner shown in Fig. 1.

When the coupling heads 5 come together for coupling up, the end of the plunger 91 will engage the lug 94 of the counterpart coupling head. This action will unseat the valve 84 and hence the fluid in the chambers 64 and 71 of the coupling head at the end of the charged section of brake pipe will be vented to the atmosphere through conduit 86, chamber 85, opening 88 and groove 95.

When the pressure of the fluid in chambers 64 and 71 is reduced by the escape of the fluid through groove 95, the pressure of the fluid in chamber 63 will force the diaphragm 62 away from the seat rib 69 and will seat the same against the seat rib 70. This action can be timed to take place immediately after the gaskets 37 have been brought together so that brake pipe pressure can be built up in the uncharged section of brake pipe.

In devices of the type herein shown and described, it is of advantage to limit the rate of reduction in brake pipe pressure in a charged section when the charged section is coupled to an uncharged section so as to prevent a too rapid reduction of the pressure in the charged section and thereby prevent undesired emergency action therein.

Accordingly, when the train pipe coupling heads 5 have been coupled in the manner described and the diaphragm 62 has been unseated from the seat rib 69 and the end of passage 67 exposed, the brake pipe fluid will by-pass around the closed plug valve 47, and flow through conduit 60 into chamber 63, and then through the choke 68 in passage 67 into the nose-end of the conduit 36, and thence into the conduit 36 of the coupling at the end of the uncharged section, the restricted rate of flow gradually building up the pressure in the uncharged section.

After the train pipe coupling heads 5 have been coupled, the pressure of the fluid in the signal pipe 34 is built up in the customary manner, and the pressure will be also built up in chamber 57, as the latter is directly connected to the signal pipe.

When the pressure of the signal pipe fluid builds up a predetermined amount in chamber 57, the piston 51 will be forced outwardly against the pressure exerted by spring 56. This action will move the tip of the rod 50 into engagement with the arm 49 and consequently continued outward movement of the piston will swing the arm 49 from left to right, thereby rotating the plug valve 47 to bring the port 48 into registration with the opening in the brake pipe 35. In this way unrestricted flow of the fluid through the adjoining conduits 36 of the coupling heads will not be had until after the conduits have been tightly connected together and a predetermined amount of pressure has been built up in the brake pipe of the uncharged section of train.

After the coupling heads have been brought together and communication is established through the adjoining conduits 36 so that fluid under pressure is delivered to the uncharged section from the charged section, and assuming that the valve 47 is closed, the diaphragm 62 of the coupling head 5 of the uncharged section will remain seated against the seat rib 69 until sufficient pressure has been built up in the passage 67 inside of seat rib 69 to force the diaphragm 62 from this seat.

Chambers 64 and 70 will be open to the atmosphere through conduit 86, chamber 85, opening 88, chamber 90 and groove 95, inasmuch as valve 84 will be unseated when the coupling heads are coupled together, as shown in Fig. 1. Therefore only sufficient pressure will have to be built up in the passage 67 to overcome the force exerted by the spring 81, to cause the unseating of the diaphragm 62 from seat rib 69 and the seating thereof against the seat rib 70.

After the diaphragm 62 of the coupling head at the end of the uncharged train section has been actuated to establish communication from the conduit 36 to the conduit 60, the fluid from the charged section will flow at a reduced rate through conduit 60 into the brake pipe 35, thereby gradually building up the pressure in the empty brake pipe. Subsequently the port 48 of the valve 47 will be brought into registration with the passage of the brake pipe 35 through the build up of sufficient pressure in the signal pipe 34 and cylinder 57 to cause the piston 51 to be moved to the outer end of its stroke in the manner heretofore described, and therefore unrestricted communication through the brake pipe of the uncharged train section will be had after the pressure of the fluid admitted thereto from the charged section has been increased a predetermined amount.

Assuming that the valve 47 of the brake pipe on the uncharged section is open when the coupling head of an uncharged section is coupled to the counterpart coupling of a charged train section, when communication is established between the adjoining conduits 36, as has been described, the fluid flowing from the charged section will be conducted through the conduit 36 directly to the brake pipe 35, passing through the port 48 in the valve 47.

When the pressure builds up in the brake pipe 35 of the uncharged section, the pressure will also be built up in conduit 60, inasmuch as this conduit is in direct communication with the brake pipe, and a build up of pressure in the portion of the chamber 63 outside of the seat rib 69 will also occur. The fluid will also flow into chambers 64 and 70 through the restricted opening 66, but as chamber 70 will be vented to the atmosphere through conduit 86, chamber 85, opening 88, chamber 90 and groove 95, the pressure will not be built up in chambers 64 and 70 an amount equal to the pressure built up in chamber 63. Accordingly after the pressure has been built up in chamber 63 a predetermined amount the diaphragm 69 will be forced from the seat rib 69 and will be seated against seat rib 70. In this way communication will be established from conduit 36 to chamber 63 and conduit 60, through choke 68 and passage 67, and as the seating of the diaphragm 62 against the seat rib 70 will cut off the communication between chambers 64 and 71, further loss of fluid from the device will be prevented.

The last car of a train having couplings of the type herein shown and described, should have dummy couplings applied to the open ends of the train pipes to close the same. Any suitable type of dummy coupling may be employed. These dummy couplings are necessary because the signal pipe will be charged and hence the plug valve 47 will be opened through the action of the piston 51, as will be understood.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a brake pipe, of a coupling having a conduit communicating with said brake pipe, a valve for controlling communication through the brake pipe, means actuated upon the coming together of the coupling with a counterpart coupling for operating the valve to open the same, a second conduit constituting a by-pass around the valve, means for permitting fluid to flow through the by-pass when the valve is closed, and means actuated upon the coming together of the coupling with a counterpart coupling for controlling the operation of said by-pass control means.

2. The combination with a brake pipe, of a coupling having a conduit communicating with said brake pipe, a valve for controlling communication through the brake pipe, a second conduit constituting a by-pass around the valve, means for cutting off communication through the by-pass when the coupling is uncoupled, and means automatically actuated upon the coming together of the coupling with a counterpart coupling for establishing communication through the by-pass.

3. The combination with a brake pipe, of a coupling having a conduit communicating with said brake pipe, a valve for controlling communication through the brake pipe, a by-pass around the valve, means for restricting the flow of fluid from the by-pass to the conduit, and means for automatically closing the by-pass when the coupling is separated from a counterpart coupling.

In testimony whereof I have hereunto set my hand, this 8th day of December, 1928.

UNCAS A. WHITAKER.